A. MAGNER.
GRIP CONTROL FOR MOTORIZED BICYCLES.
APPLICATION FILED NOV. 28, 1917.

1,281,043.

Patented Oct. 8, 1918.

Witness:
A. W. Jamieson

Inventor.
ALFRED MAGNER,

By David O. Barnell
Attorney.

UNITED STATES PATENT OFFICE.

ALFRED MAGNER, OF OMAHA, NEBRASKA.

GRIP CONTROL FOR MOTORIZED BICYCLES.

1,281,043.  Specification of Letters Patent.  Patented Oct. 8, 1918.

Application filed November 28, 1917. Serial No. 204,796.

*To all whom it may concern:*

Be it known that I, ALFRED MAGNER, a citizen of the United States, and a resident of Omaha, in the county of Douglas and State of Nebraska, have invented certain new and useful Improvements in Grip Controls for Motorized Bicycles, of which the following is a specification.

My invention relates to grip controls for motorized bicycles, motorcycles, and the like. It is the object of my invention to provide an inexpensively constructed, durable and easily assembled and dismounted device of the character set forth, which may be readily attached to the handle-bars of a bicycle or motorcycle to furnish a reliable controlling means for the engine, motor-wheel, or the like used for propelling the vehicle, and which will also serve as an extension of the handle-bars to enable the user to assume an erect and easy riding position. The device provided by my invention is especially adapted, by the facility with which it may be attached to the ends of ordinary tubular handle-bars, for use in motorizing bicycles by the addition thereto of an engine, motor-wheel or the like and controlling means therefor.

Figure 1:
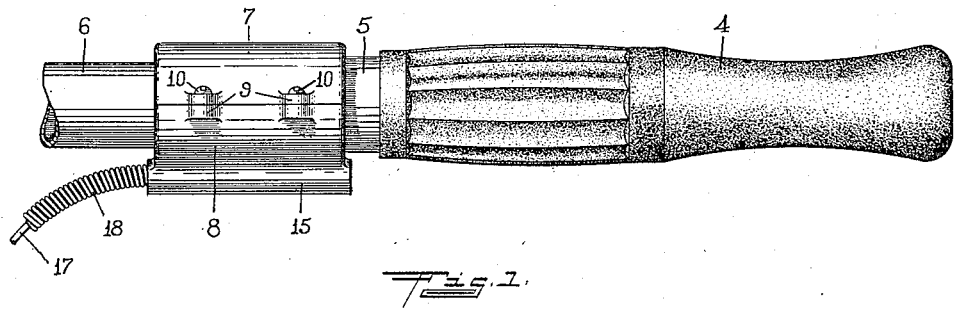
Figure 2:
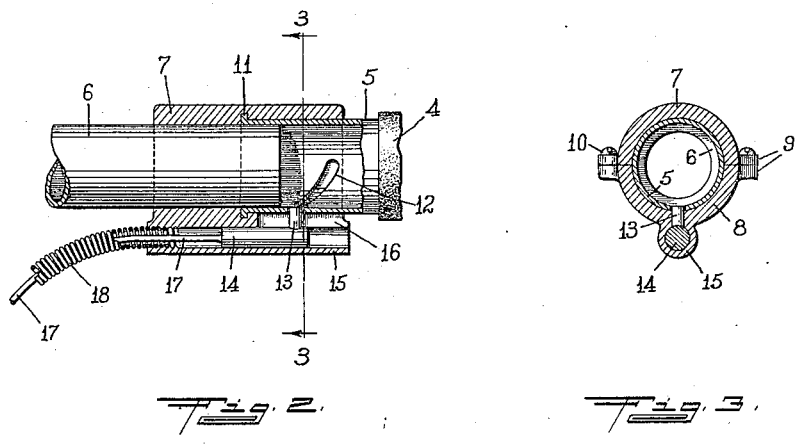
Figure 3:
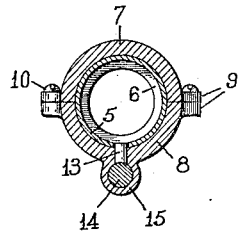

In the accompanying drawings Figure 1 is a side view of a device embodying my invention, Fig. 2 is a detail longitudinal section of the principal operating portion thereof, and Fig. 3 is a detail transverse section on the plane of the line 3—3 of Fig. 2.

In the illustrated embodiment of my invention I provide a suitable grip 4 of a size and shape adapted to fit comfortably within the hand, the grip preferably being of rubber or like resilient material so as to reduce to a minimum the amount of vibration transmitted thereby from the handle-bars to the hands and arms of the rider. A metal tube 5 is permanently secured in the front end-portion of the grip 4, said tube being coaxial with the grip and projecting beyond the front end thereof as shown. The internal diameter of the tube 5 is preferably such that the end-portion 6 of a tubular handle-bar may fit slidably therein. The grip-tube 5 and the handle-bar 6 are connected to each other by means of a two-part clamp-sleeve comprising upper and lower semi-tubular portions 7 and 8 having laterally projecting lugs 9 through which screws 10 are passed to secure the parts together. The bore of the front portion of the sleeve is such that the same will be securely clamped upon the handle-bar 6 when the sleeve-parts 7 and 8 are drawn together by the screws 10, while the bore of the rear portion of the sleeve is such that the grip-tube 5 will fit rotatably therein when the same is clamped on the handle-bar. The tube 5 is provided terminally with an annular flange 11 which fits revolubly in a groove or channel in the sleeve and prevents withdrawal of the tube from the sleeve. The part of the grip-tube inclosed by the clamp-sleeve has therein a helical slot 12, into which a pin 13 is extended from the side of a plunger 14. Said plunger is held slidably in a small cylinder 15 formed integrally with the lower part 8 of the clamp-sleeve, said cylinder being axially parallel with the sleeve, and the pin 13 extending through a longitudinal slot 16 connecting the bore of the cylinder with that of the sleeve. The arrangement of the helical slot 12 and pin 13 is such that rotation of the tube 5 relatively to the clamp-sleeve causes longitudinal movements of the pin and the plunger 14, which are employed to actuate the motor-controlling devices such as a throttle and ignition-timing members. The connection from the plunger to the throttle or the like is made by means of a longitudinally movable control-wire 17 which is secured to the end of the plunger, as shown, and extends through a flexible casing 18 to any desired point. The casing 18 is secured to the end of the cylinder 15, preferably by threading the front end-portion of the cylinder and screwing into the same the spiral wire which forms the sheath or wall of the casing.

The operation of the mechanism will be apparent. It will be obvious that the clamp-sleeve may be readily attached to and detached from the ends of ordinary tubular handle-bars of bicycles, and the position of the grip varied longitudinally within certain limits by inserting the handle-bar to a greater or less extent in the grip-tube 5 before the clamp-sleeve is firmly secured to the handle-bar. The grip, by increasing the length of the handle-bars, enables the rider to assume an erect position such as is desirable in riding a motor-driven bicycle, rather than the stooped position, usually necessary for foot-propelled bicycles, and for which the ordinary handle-bars are best suited.

Now, having described my invention, what I claim and desire to secure by Letters Patent is:

1. The combination with a handle-bar of a motorcycle, motorized bicycle or the like, of a tubular sleeve adapted to fit upon the end-portion of said handle-bar, means for detachably securing said sleeve thereto, a grip having a helically slotted portion fitting revolubly within said sleeve and extending coaxially therewith, a cylinder carried by said sleeve and extending parallel therewith, a plunger slidable in said cylinder, and a pin connecting said plunger with the helically slotted portion of the grip and adapted to move the plunger longitudinally by rotation of the grip.

2. In a motorized bicycle, motorcycle or the like having a tubular handle-bar, a sleeve adapted to fit upon a rectilinear end-portion of said handle-bar, means for clamping said sleeve thereon, a grip having a tubular end-portion coaxial with and fitting rotatably within said sleeve and retained longitudinally thereof, a cylinder carried at one side of said sleeve, a plunger slidable in said cylinder, a pin carried by said plunger and extending through a longitudinal slot in the sleeve and into a helical slot in the tubular end-portion of the grip, a control-wire secured to said plunger, and a flexible casing inclosing said control-wire and secured to said cylinder.

3. In a grip control mechanism for motorcycles, motorized bicycles and the like, a grip having a tubular helically slotted end-portion, a sleeve in which said end-portion of the grip is held revolubly, means for clamping said sleeve upon the end of a handle-bar to retain the grip coaxially therewith, a longitudinally movable control member, guiding means for retaining said member slidably adjacent to one side of the slotted portion of the grip, and means carried by said member and coöperative with the helical slot to move said member in accordance with rotational movement of the grip.

ALFRED MAGNER.

Copies of this patent may be obtained for five cents each, by addressing the "Commissioner of Patents, Washington, D. C."